May 21, 1963 G. H. STIMSON 3,090,171
SURFACE MEASUREMENT APPARATUS AND CONTROL
Filed July 31, 1959 6 Sheets-Sheet 1

INVENTOR.
GLEN H. STIMSON
BY Frank A. Brown
his ATTORNEY

May 21, 1963    G. H. STIMSON    3,090,171
SURFACE MEASUREMENT APPARATUS AND CONTROL
Filed July 31, 1959    6 Sheets-Sheet 2

INVENTOR.
GLEN H. STIMSON
BY Frank A. Bower
his ATTORNEY

May 21, 1963

G. H. STIMSON

3,090,171

SURFACE MEASUREMENT APPARATUS AND CONTROL

Filed July 31, 1959

INVENTOR.
GLEN H. STIMSON
BY
ATTORNEY

May 21, 1963 G. H. STIMSON 3,090,171
SURFACE MEASUREMENT APPARATUS AND CONTROL
Filed July 31, 1959 6 Sheets-Sheet 4

INVENTOR.
GLEN H. STIMSON
BY
Frank A. Bower
his ATTORNEY

May 21, 1963  G. H. STIMSON  3,090,171
SURFACE MEASUREMENT APPARATUS AND CONTROL
Filed July 31, 1959  6 Sheets-Sheet 5

INVENTOR.
GLEN H. STIMSON
BY Frank C. Bower
his ATTORNEY

May 21, 1963 G. H. STIMSON 3,090,171
SURFACE MEASUREMENT APPARATUS AND CONTROL
Filed July 31, 1959 6 Sheets-Sheet 6

INVENTOR.
GLEN H. STIMSON
BY Frank W. Bower
ATTORNEY

U̲n̲i̲t̲e̲d̲ S̲t̲a̲t̲e̲s̲ P̲a̲t̲e̲n̲t̲ O̲f̲f̲i̲c̲e̲

3,090,171
Patented May 21, 1963

3,090,171
SURFACE MEASUREMENT APPARATUS
AND CONTROL
Glen H. Stimson, Greenfield, Mass., assignor to United-Greenfield Corporation, a corporation of Delaware
Filed July 31, 1959, Ser. No. 830,904
4 Claims. (Cl. 51—165)

This invention relates to apparatus and method for measuring the position of a surface and the nature of the contour of the surface by a testing probe without engaging the measured surface and the transferring of the measurement to a control means for correcting deviations from a desired standard.

In the manufacture and processing of an article it is desirable to continuously and automatically measure the form and position of the surface of the equipment shaping the article. These measurements may then be utilized to control the manufacturing process, to increase the accuracy and precision of the steps of manufacture and to perform the manufacturing steps automatically. In many manufacturing processes the measuring apparatus must not or cannot engage the measured surface. It is, therefore, necessary to measure the working surface by an instrument in spaced relation thereto. Such an instrument must be influenced only by the measured surface and must remain unaffected by the surrounded apparatus.

The measuring apparatus of this invention may be adapted to measure various types of surfaces. In the following description the measuring apparatus is described in detail in connection with the measurement of the surface of a grinding wheel and the control of the grinding operations.

In grinding operations, particularly with a rotating grinding wheel, the surface of the grinding wheel loses its trueness as the grinding operation is performed. In order to maintain the accuracy of the grinding operation, the grinding surfaces must be recut to restore the proper contour to the surfaces and must be repositioned in relation to the workpiece. The length of the period between redressings of the wheel depends on the rate of wear of the grinding surfaces, the degree of accuracy required in the finished work, the relative hardness and toughness of the workpiece and the grinding wheel, the rate of loss of the contour of the grinding surfaces, the size and speed of the wheel and the nature of the workpiece.

Heretofore, the grinding wheel has been dressed at periodic intervals with an estimated amount of the grinding wheel being removed. In order to compensate for the decrease in the size of the grinding member the workpiece was correspondingly shifted in position an average distance determined empirically. The length of the interval and the amount of redressing is estimated from experience. This method produces an approximately accurate reconditioning of the active cutting or grinding surfaces of the grinding member. However, it develops variations beyond the desired tolerance in the resulting machined surface. In the formation of gages and taps an absolute precision is of great importance and yet this precision has not been attained.

An object of the present invention is to provide a system for continuously measuring a surface which cannot be engaged by the measuring instrument.

Another object of the invention is to provide an apparatus to accurately measure the relationship between a moving surface and a given position.

Another object of the invention is to provide an apparatus which determines the position and condition of a moving surface and actuates the apparatus to perform an operation in response to the measurement in accordance with the operating procedure.

Another object of the invention is to provide an apparatus for measuring moving surfaces which is not influenced by adjacent equipment.

Other objects will become apparent from the following descriptions of specific embodiments of the invention as illustrated in the drawings in which.

In this embodiment the apparatus is adapted to measure the V-shaped surfaces of the grinding wheels which cut grooves in taps. Two different grinding apparatuses are disclosed. In both of these grinding apparatuses the axis of the grinding wheel remains stationary and the tool is moved relative thereto. However, it is understood that the invention is equally applicable to grinding apparatuses where the grinding wheel is moved in relation to the tool.

Figures 1, 6:
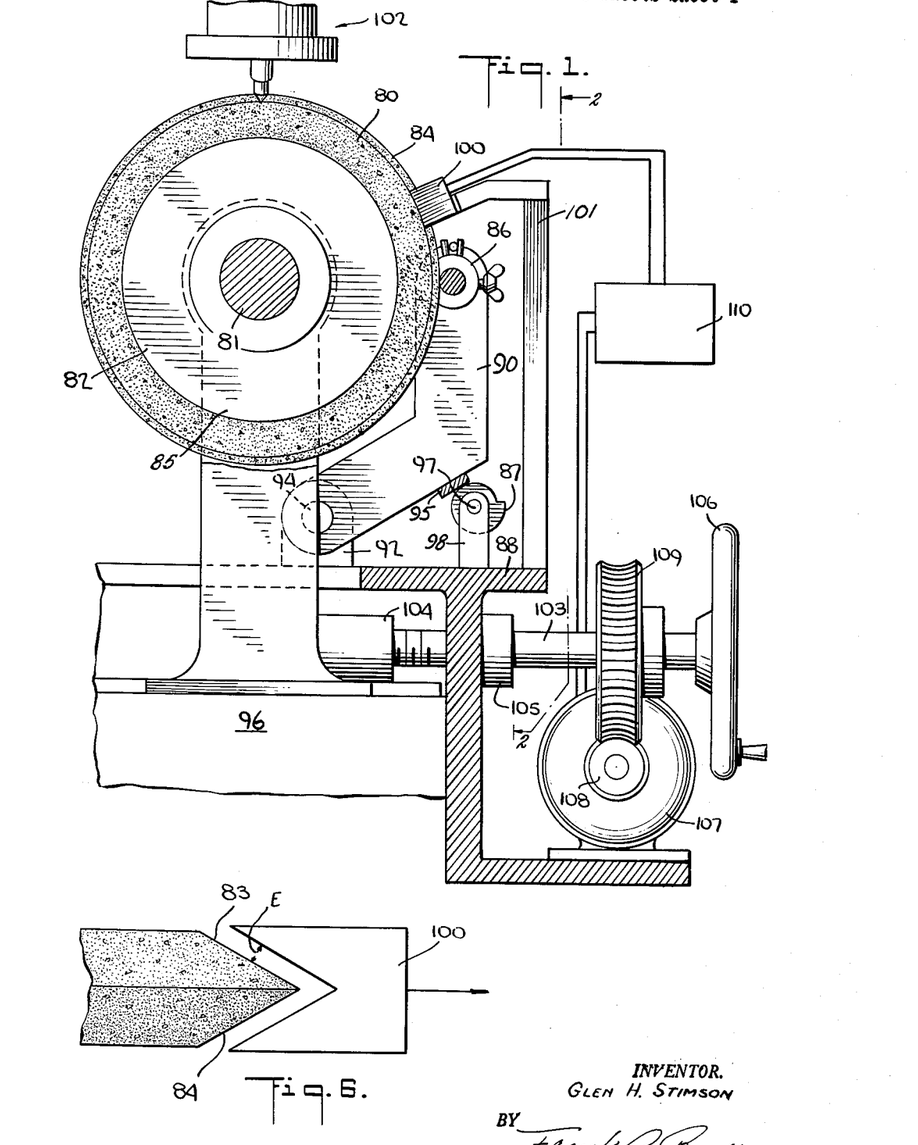
FIG. 1 is an end view of a grinding apparatus taken along line 1—1 of FIG. 2 with a grinding wheel having a fixed center and the tool support movable in relation thereto.
FIG. 6 illustrates the relationship between the measuring probe and the grinding wheel of the embodiments in FIGS. 1 and 8.

In FIG. 1 the grinding wheel 80 is mounted on the shaft 81 by the discs 82 to rotate about a fixed axis. The shaft 81 is rotatably mounted in pedestal 85 mounted on base 96. When used for cutting grooves in taps and the like, the grinding wheel has a V-shaped edge formed by surfaces 83 and 84. These surfaces are dressed by the trueing mechanism 102 supported above the wheel. The trueing mechanism is raised and lowered to engage the grinding wheel in any suitable manner well-known in the art. The spacing and contouring of the surfaces 83 and 84 are measured by a probe 100 mounted on a table 88. The table moves laterally to the axis of the grinding wheel 80 and supports a tap-holding means. The tap-holding means is pivotally mounted on the table by means of blocks 91 and 92 having studs 93 and 94. The tap-holding means has arms 89 and 90 for supporting the tap. A rigid strip 95 extends between the arms 89 and 90 to rigidly connect the arms.

The table 88 is slideably mounted on the base 96 by any conventional means to produce a linear-planar movement of the table 88. Means are provided between the table and the tool-holding means for feeding the tool toward the grinding wheel to form the thread. The table 88 is positioned in relation to the wheel 80 by a measuring and control means which includes a probe 100 for sensing the relationship. The probe 100 is mounted on an arm 101 rigidly secured to the table 88 to support the probe 100 in a fixed position. The probe 100 senses the position of the surfaces 83 and 84 of the grinding wheel. As the tap is moved inwardly by movement of the table 88, the probe 100 moves closer to the grinding wheel. When the tap is moved to the precise position for cutting tap surfaces, the probe senses the relationship to the grinding wheel 80 and discontinues the feeding of the table 88. The tap is rotated at a given speed and is moved axially to form the cutting threads. The actual feeding of the workpiece against the grinding wheel is accomplished by the cam 87. The cam 87 is rotatably mounted on supports 98 rigidly fastened to the table 88. The cam 87 is rotated by means of the shaft 97 which is connected to any suitable means for slowly rotating the cam 87. The cam 87 bears against the plate 89a mounted on the strip 95. As previously described, the table 88 is accurately positioned in relation to the grinding wheel by the probe 100. The cam 87 is then rotated to slowly feed the tap into the grinding wheel 80. Before the thread is completed the grinding operation is discontinued and the dressing means 102 are moved down and the surfaces 83 and 84 are reshaped. The dressing means are then raised and the table 88 is moved to reposition the table in relation to the new surfaces of the grinding wheel. The cam is then actuated to produce the final cut in the tap 86. When the proper relationship has been achieved, the cam discontinues the feeding process.

In FIG. 1 the table 88 is moved by means of a threaded shaft 103 threaded in a bushing 104 fixedly mounted on the base 96. The shaft 103 is rotatably mounted in the collar 105 fastened to the table 88. As the shaft 103 is rotated by the handle 106 or by the motor 107 through the worm 108 and gear 109, the table 88 is moved in relation to the grinding wheel 80. The motor 107 is secured to the table 88 and is controlled by means of an electrical circuit connected to the probe 100. The signal produced by the probe 100 is impressed on electrical circuit 100 to produce an actuating signal. The electrical control circuit 110 may be of various types.

Figures 3, 4:
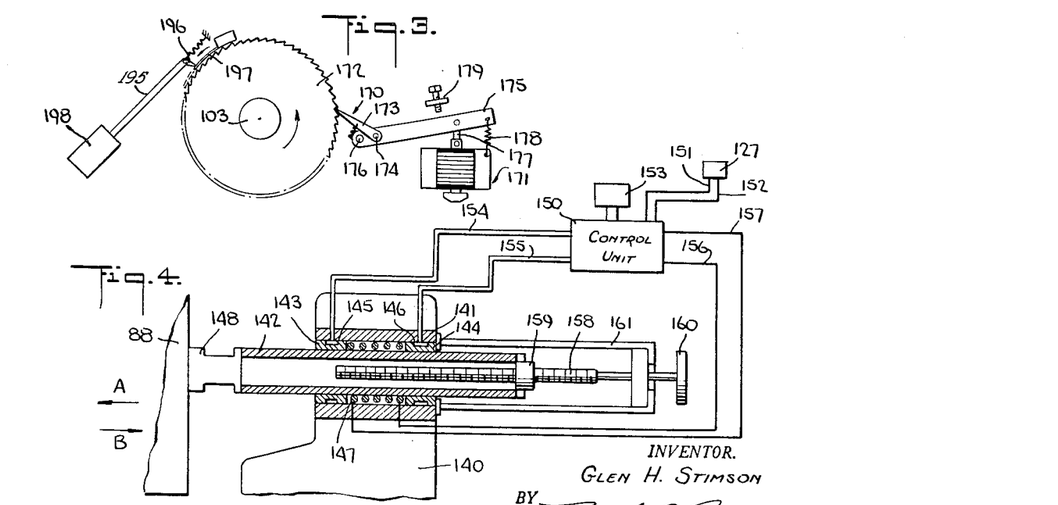
FIG. 3 illustrates a solenoid and ratchet mechanism for actuating the tool support or the grinding wheel support to vary the relationship between the axis of the grinding wheel and the tool.
FIG. 4 illustrates another embodiment for moving the tool support or the grinding wheel of FIG. 8.

In FIG. 3 the threaded shaft 103 is rotated by means of a ratchet mechanism 170 and solenoid 171 instead of by the motor 107. The ratchet mechanism comprises a ratchet wheel 172 mounted on the threaded shaft 103. The spring loaded pawl 173 is pivotally mounted at 174 on the bar 175 which is pivotally mounted on a pin 176. The bar 175 is actuated by the solenoid 171 by means of the link 177 and is spring loaded by means of the spring 178. The stroke of the armature of the solenoid is limited by an adjustable stop 179. The solenoid 171 is actuated by a pulse. The electrical circuit 110, instead of supplying a continuous current, provides a pulsating current which actuates the solenoid so that the pawl and ratchet wheel move through a specified arc and thus incrementally move the tool toward the grinding wheel. When the tool is in proper relation to the grinding wheel, the pulsations are discontinued. For example, the ratchet mechanism may be set to move the tool one ten-thousandth of an inch for each actuation of the solenoid. The solenoid and ratchet mechanism provides a positive movement of the tool and tool support through a given distance and provides a positive force on the threaded shaft 103 and collar 104 so that the threaded shaft and collar are held in firm engagement. The positive determinative movement of the tool support by the ratchet mechanism avoids any complications of overriding or overdriving of the actuating mechanism that may occur in connection with the motor.

Instead of feeding the tool 86 by means of the cam 87, the tool support may be fixed on the table 88 and the tool 86 moved toward the grinding wheel by means of the threaded shaft 103. The ratchet wheel 172 is actuated by a shaft 195 and pawl 196. The pawl 196 rests on a shield 197 and at the end of each pass the shaft 195 is actuated by a solenoid or air cylinder 198 and the pawl 196 moves off the shield 197 and incrementally rotates the ratchet wheel 172 through a specified angle to move the tool 86 toward the grinding wheel for the next pass of the grinding wheel. After the roughing passes are made the shield 197 is rotated to prevent further actuation of the ratchet wheel 172 by the pawl 196. The final movement of the tool after dressing is then accomplished by means of the ratchet mechanism 170 and the solenoid 171 as previously described. It is, of course, understood in connection with the foregoing embodiment of the grinding apparatus and in the following embodiments that the tool may be stationary and the grinding wheel moved in relation thereto. This invention is not limited to the actuation of the tool support.

Figure 7:
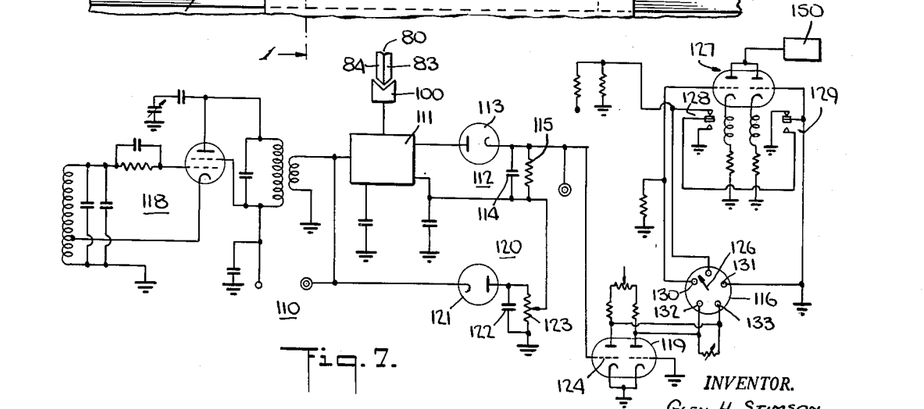
FIG. 7 illustrates the electronic circuit utilized with the probe illustrated in FIG. 1.
Figure 10:
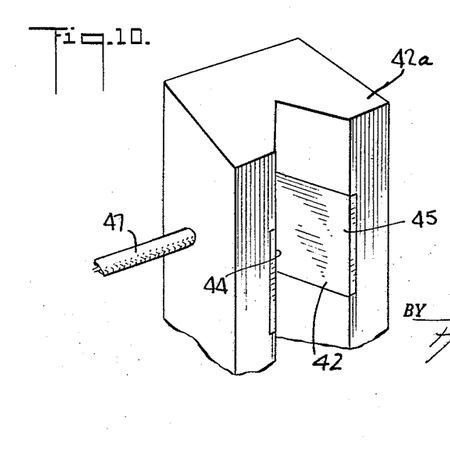
FIG. 10 is a perspective view of the probe block.

In FIG. 10 the probe 42 is mounted in a plastic block 42a with a V-shaped groove corresponding to the V-shape formed by the surfaces 44 and 45. The lead 47 has the end embedded in the block and connected to the probe 42. The probe is unaffected by external apparatus. The grinding wheels are of a conductive type. The probe 100 and the grinding wheel form a capacitance which is part of the network 111. As the spacing of the probe and the wheel changes, the capacitance changes. The oscillator 118 produces a signal passed through networks subject to the variation of the probe and wheel. This signal is passed to the detector 112 which comprises a diode 113, a condenser 114 and a resistor 115. The detected signal is amplified by the amplifier to produce an actuating signal. This signal may be impressed on various types of control means to produce a response actuating the meter. A meter 116 is provided with a calibrated scale. The signal can be further supplied to a motor control unit for controlling the rotation of the motor 107.

The signal produced by the oscillator 118 is passed through the detector circuit 120 formed by the diode 121, the condenser 122 and the resistor 123. A voltage is produced across the resistor 123. The resistor has an adjustable tap in engagement therewith connected to the detector circuit 112. The tap is adjusted so that a zero voltage is impressed between ground and the grid 124 of the amplifier 119. This zero adjustment is made if the adjustment of the condenser 122 does not establish a zero minimum at the input to the matching network. The output of the amplifier is coupled to a motor or actuator control means 150.

The meter 116 is of the electromagnetic type with the signal of amplifier 119 impressed across terminals 132 and 133.

Upon the creation of a signal resulting from the change in spacing of the probe from the wheel, the needle 126 will swing to contact 130 or 131 to produce a signal in the output of the tube 127 by the actuation of the relays 128 and 129. When the signal drops to within the required range, the tube 127 ceases to function and relays 128 and 129 return to their normal position.

As illustrated in FIG. 1 the table supporting the tool is driven by an electric motor 107 through a worm 108, a gear 109 and a threaded shaft 103. However, other means may be used to adjust the position of the table. Another means is shown in FIG. 4 in which a linear actuating means is illustrated. This actuating means is comprised of a base 140 having a sleeve 141. A magnostrictive armature 142 is supported by clamps 143 and 144 in the sleeve 141. The armature 142 can slide relative to the clamps. The clamps 143 and 144 have annular chambers 145 and 146 filled with a hydraulic fluid which applies a pressure to the clamp for gripping the armature and holding it in position. Between the clamps an electromagnetic coil 147 is provided. On passage of current through the coil, the armature 142 is magnetized and expands longitudinally. The armature has a connecting member 148 for fastening the armature to the table 88. If the clamp 144 is gripping the armature 142 and if the clamp 143 is released when the coil 147 is energized, the armature will move the table 88 in direction A. If the clamp 143 is gripping the armature 142 and the clamp 144 is released when the coil 147 is energized the armature will move in direction B and on gripping of the clamp 144, release of clamp 143 and de-energization of the coil 147 the armature draws the table 88 in direction B. On movement in direction A the clamp 143 grips the armature 142 before the current through coil 147 is stopped and on movement in direction B the clamp 144 grips the armature 142 before the current through coil 147 is stopped. A control unit 150 is provided to which the power amplifier 127 is connected by wires 151 and 152. On the contacting of terminal 130 or 131 of the meter a signal is provided to the control unit 150 to actuate the linear actuating means to move the table 88 toward the grinding wheel. A separate control unit 153 is provided to actuate the control unit 150 so that the table is moved away from the grinding wheel. The clamps 143 and 144 are connected to the control unit 150 by means of fluid-bearing tubes 154 and 155 and the coil 147 is connected by the wires 156 and 157. The armature 142 of the linear actuator moves the table in increments from sixty to ninety micro-inches and exerts a force of approximately three hundred pounds. The armature may be manually moved by means of the threaded shaft 158 and collar 159 by rotation of the shaft 158 by means of the knob 160 mounted in the fixed frame 161.

Figure 8:
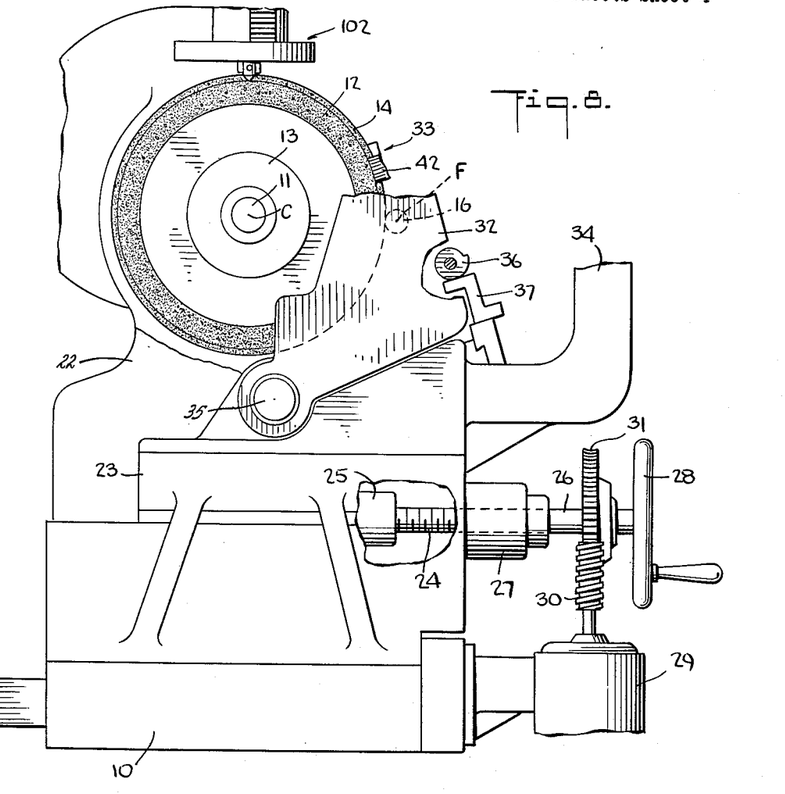
FIG. 8 illustrates another embodiment wherein the tool support and probe are fixedly supported on a stationary base and the grinding wheel is movable.

Referring to FIG. 8, the machine comprises a base 10 which rotatably supports a shaft 11 turning about a fixed axis C. The shaft 11 is mounted on a pedestal 22 and rotated at a high speed by a conventional drive (not illustrated). A grinding wheel 12 is securely mounted on the shaft 11 by means of mounting discs 13 and in this embodiment has V-shaped grinding surfaces 14 and 15 for cutting threads in the tap 16. The surfaces 14 and 15 are at a given angle and rotate around the axis C. The grinding wheel may be of a vitrified type and has the characteristic of conducting an electric current. The grinding wheel is in conductive relation to the discs 13.

Figure 14:
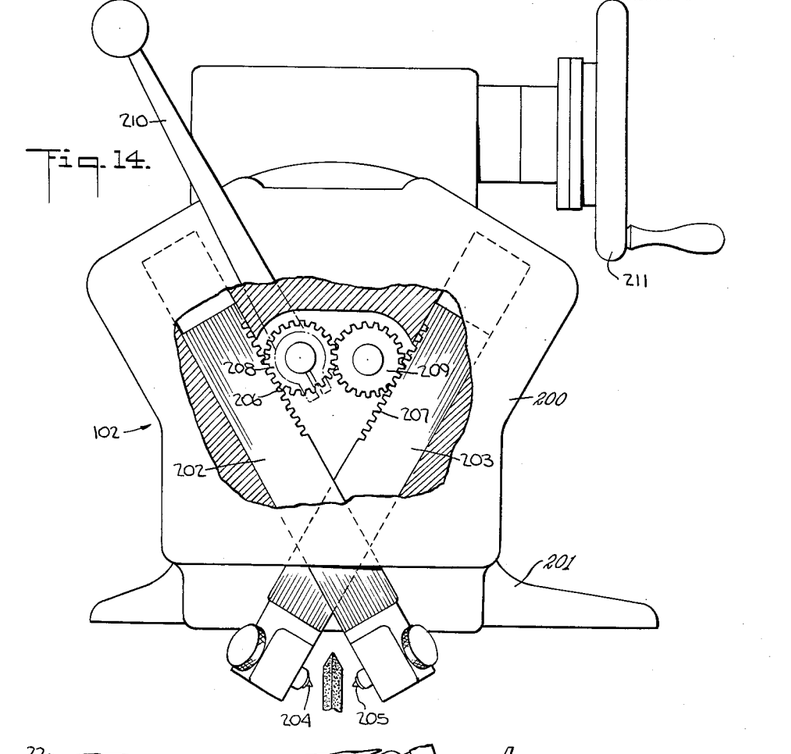
FIG. 14 is a fragmentary end view of the trueing mechanism.

The means 102 for dressing the grinding surfaces 14 and 15 is of a conventional type and is raised and lowered. The support is advanced to properly dress the surfaces 14 and 15 to the desired contour. The amount of dressing is fixed and is determined from experience. A conventional trueing or dressing mechanism 102 is illustrated in FIGURE 14 and comprises a block 200 mounted on the frame 201 of the machine with two slides 202, 203 holding the diamond points 204, 205. The slides have racks 206, 207 engaged by gears 208, 209. The gears are meshed, with one gear 208 rotated by a handle 210 and the other gear 209 rotated through the meshing teeth. The block 200 is vertically adjusted by the handle 211.

A table 23 is slideably mounted on the base 10 to move normal to the shaft 11. The table supports the contour measuring means 33 and the cradle holding the tap. The table is moved by a lead screw 24 threaded in a nut or bushing 25 integral with the table. The screw 24 is formed on the shaft 26 which is supported by the bearing 27 mounted on the base 10. The lead screw may be turned either by the hand wheel 28 or by means of the size control motor 29 through the worm 30 and the gear 31. The motor 29 is mounted on the fixed base 10. The table is thus shifted in relation to the shaft 11 supporting the grinding wheel. The table may also be moved by the linear actuator illustrated in FIG. 4 or by the ratchet mechanism illustrated in FIG. 3. This provides a very precise control of the movement of the probe and the top in relation to the grinding wheel or the grinding wheel in relation to the probe and the tap depending on the type of grinder.

Figure 5:
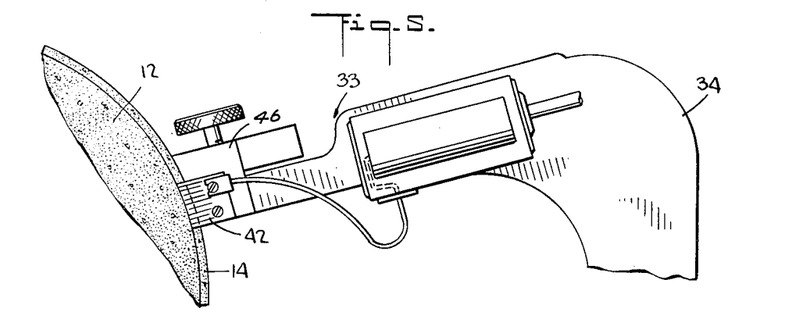
FIG. 5 illustrates a means for measuring the relationship between the tool support and the grinding wheel utilized in the embodiments of FIGS. 1 and 8.

The workpiece or tap 16 and the contour measuring means 33 are supported on and move with the table 23. The contour measuring means is rigidly mounted on the table 23 by means of the supporting arm 34 (FIG. 5). The tap 16 is rotatably supported on a pivotally mounted cradle. The cradle or rocking bed 32 has two arms pivotally mounted on a shaft 35 securely mounted on the table 23. This provides for movement of the tap in relation to the measuring means and the grinding wheel. The tool is positioned by means of a cam 36 and a taper bar 37. The cam is rotatably mounted on the cradle and the bar is slideably mounted on the table 23. As the cam rotates, the tap is moved into the grinding wheel. The cam is driven by means not illustrated.

Figure 2:
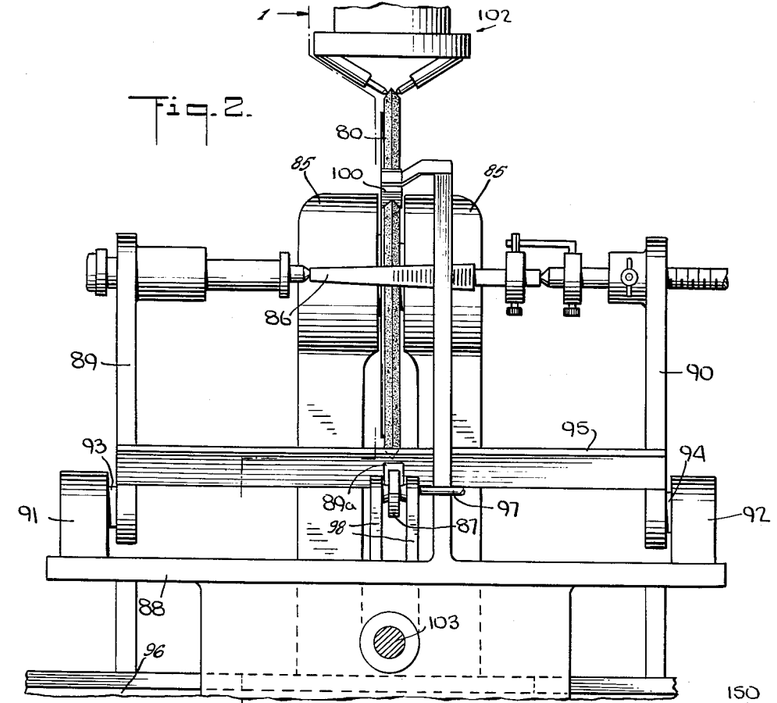
FIG. 2 is a side view of the foregoing apparatus taken along line 2—2 of FIG. 1.

The tap 16 is rotatably supported between centers as illustrated in FIGS. 1 and 2. The tap 16 is moved back and forth in engagement with the grinding wheel 12 and the cam 36 is slowly rotated by driving means (not shown). The driving means move the cradle 32 with the tap toward the grinding wheel so that the depth of the thread slowly increases. As explained later herein, when the cam has been rotated approximately the full length of the cam surface the table is moved away from the grinding wheel and the surfaces 14 and 15 are re-dressed. The table with the tap and contour measuring means is moved back into position and the contour measuring means actuates the table actuating means so that the table is actuated to move in against the grinding wheel. Since the grinding wheel has been reshaped, the final cutting of the tap is produced by the movement of the table under the control of the size control motor and the contour measuring means. When the contour measuring means is in the desired relation with the grinding wheel, the movement of the table ceases and the grinding operation is completed. The tap is then removed and the next tap inserted.

Figure 9:
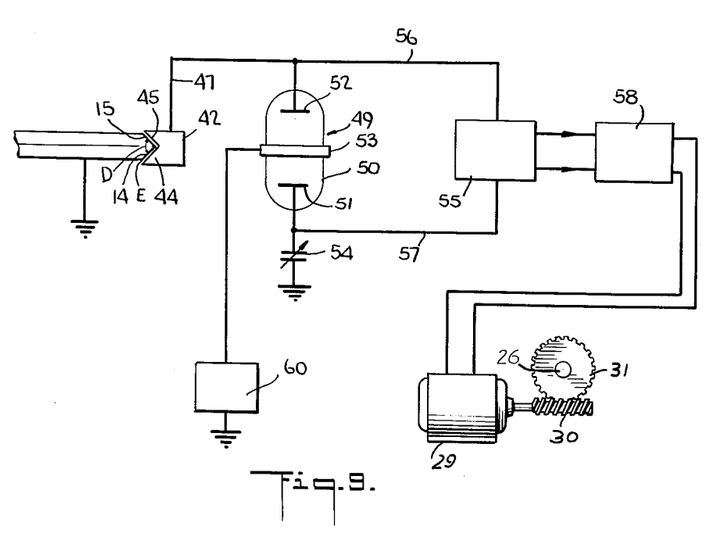
FIG. 9 illustrates another circuit for detecting and utilizing the signal to determine the relationship of the workpiece and grinding wheel.

The contour measuring means 33 comprises a unit which can determine the position of the grinding surfaces 14 and 15 while the grinding wheel is rotating and while the cutting operation is being performed. The sensing member cannot cause any wear on the grinding surface. The operation of the grinding wheel, the flow of the coolant or the abraded particles should not affect the measuring characteristics. The variation in the temperature of the machine and the lubricating and cooling materials should not affect the measuring characteristics. The relation between the unit and the wheel is similar to the relation described previously in this application in connection with FIG. 6. In this embodiment the sensing unit comprises a block 42 having a V-shaped groove with surfaces 44 and 45. The block is fastened to an adjustable supporting member 46 securely mounted on the supporting arm 34. As illustrated in FIG. 9, the grinding surfaces 14 and 15 are positioned between the surfaces 44 and 45 and spaced therefrom a distance E. In this embodiment the grinding wheel 12 may be of a conductive or of a non-conductive type. The block 42 is connected by a wire 47. Thus, the wheel and block form opposite plates of a condenser. As the grinding surfaces 14 and 15 become worn and the space E is increases in size, the capacitance changes. This change is registered by the detection unit. Thus, the degree of departure of the grinding surfaces from the desired shape and position is detected.

The grinding wheel 12 is periodically dressed by the wheel dresser 102. This dressing up is preferably performed one time for each tap. The sensing surfaces 44 and 45 and the axis F of the tap 16 are set in a given relation by the cam 36 and taper bar 37. With this relation set, the position of the table 23 may be precisely set by the size control motor 29. The position of the tap in relation to the grinding surfaces 14 and 15 is under the control of the sensing block 42 and the detection unit. The tap is positioned at the grinding wheel and the grinding of the thread commences under the control of the cam. When the grinding is almost completed, the tap is moved away from the grinding wheel by the horizontal movement of the table. The dresser 102 is lowered and the surfaces 14 and 15 are reshaped to provide the proper contour to the surfaces. On completion of the dressing step the dresser is lifted clear of the grinding wheel and the tap is returned to engage the reformed grinding surfaces 14 and 15. The table 23 is moved under the precise control of the measuring block 42 and the detection unit. With the grinding surfaces redressed to the proper form the final grinding of the tap is performed to remove the metal left by the unsharpened grinding surfaces. The detection unit with the block 42 produces a signal operating the size control motor or linear actuator to slowly feed the table and move the tap into the grinding wheel. When the block 42 reaches the desired position, the actuation of the size control motor 29 ceases and the grinding operation is completed.

The detection unit may be of various types that would receive the variation in the capacitance to produce a signal that is proportional to the change in capacitance. The final signal must be sufficient to actuate the size control motor. The detection unit must be sufficiently sensitive to detect small changes in capacity and amplify the changes to operate the size control motor.

The detection unit illustrated in FIG. 9 comprises a transducer 49 connected to the block 42 by the line 47. The transducer unit 49 comprises a gaseous discharge tube 50 with internal electrodes 51 and 52 and a third external ionization electrode 53. The electrode 52 is connected to the block 42 by the line 47. The electrode 51 is connected to ground through an adjustable condenser 54. The electrically conductive grinding wheel is connected to ground to complete the circuit to the grinding surfaces 14 and 15. Thus, the electrodes 51 and 52 are connected to opposite plates of the condenser formed by the surfaces of the block 42 and the surfaces 14 and 15 of the grinding wheel. A high frequency oscillator 60 is connected to the electrode 53 to excite the tube 50. If the circuit is balanced, the potential across the electrodes 51 and 52 is zero. If the circuit is unbalanced a voltage will be produced across the electrodes 51 and 52. This signal is impressed on the amplifier 55 by the lines 56 and 57. The signal operates the motor control circuit 58 which actuates the size control motor. The circuit is connected to the tube 50 by positioning the grinding wheel in a given relation to the block 42. The condenser 54 is then adjusted so that no signal appears across the electrodes 51 and 52. If the relationship of the grinding wheel of the surfaces 14 and 15 changes with respect to the block 42, a signal will be produced. As previously described, when the surfaces 14 and 15 are worn, the profile of the grinding wheel changes and thereby changes the relationship between the grinding wheel and the block 42 to produce a signal. The grinding wheel is redressed. The table carrying the block 42 and the workpiece are then moved back into operating position. This movement continues until the block 42 reaches the desired relation with the grinding wheel. The table is then in proper relation with the grinding wheel so that the workpiece may be brought into contact with the grinding wheel and the finishing operation on the particular thread is completed.

Figure 13:
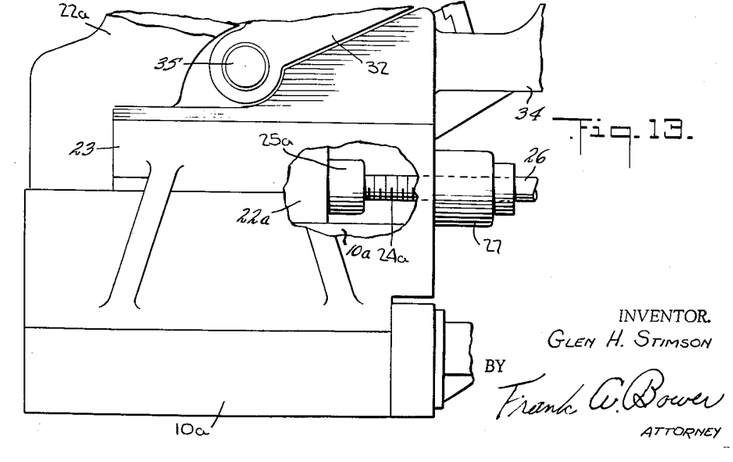
FIG. 13 illustrates the embodiment moving the grinding wheel in relation to the workpiece.

In FIG. 13 the pedestal 22a is slideably mounted on the base 10a and supports the grinding wheel. The threaded bushing 25a is attached to the pedestal 22a and the bearing 27a is mounted on the base 10a. The screw 24a is rotatably mounted in the bearing 27a and is in threaded engagement with the bushing 25a. The screw 24a may be driven by an electric motor or by the ratchet mechanism of FIG. 3. The tap is supported by the cradle 32 and may be tilted toward the grinding wheel by the cam 36 in a similar manner to the embodiment of FIG. 8. In FIG. 1 the tool-supporting table approaches the grinding wheel under the actuating force of the prime mover. Particularly with electric motors driving through worm and thread gears there is a strong tendency for the table to override. This overriding is produced by the inertia of the table and the pressures built up in the driving mechanism which continues to apply pressure and movement to the table after the motor has stopped. The motor may be braked to stop its rotation as soon as the signal received from the control circuit indicates that the proper position of the probe and the wheel has been reached. This braking action may be applied to the alternating current motor by a six-volt direct current being impressed on the windings of the motor.

Figure 11:
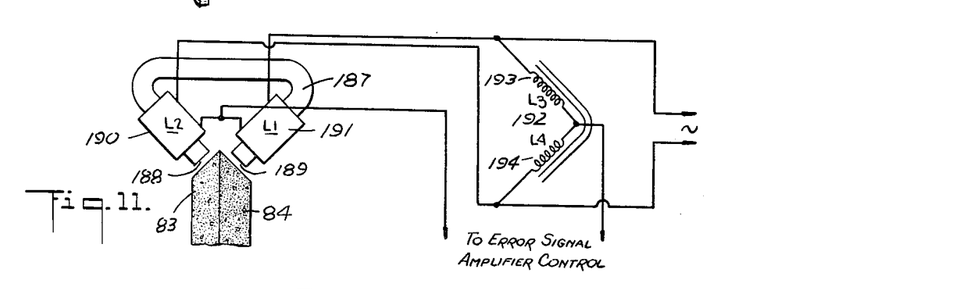
FIG. 11 illustrates another embodiment for measuring the surface of the grinding wheels.

The sensing apparatus illustrated in FIG. 11 comprises a soft iron core 187 with two surfaces 188, 189 facing the surfaces 83 and 84 of the grinding wheel. The core may be a generally U-shaped piece with coils 190 and 191 mounted on opposite legs adjacent the surfaces. The coils provide a flux extending between the ends of the core. The grinding wheel is of a magnetic composition to affect the flux and the coupling of the coils. At different spacings of the grinding wheel from the core the coils will be coupled differently. As illustrated, the coils are connected in a bridge 192 with coils 193 and 194 having a fixed coupling. The change in the coupling of the coils 190 and 191 produces an error signal across the output terminals. A voltage is impressed across the input terminals from a voltage supply.

Thus, the separation of the surfaces of the grinding wheel from a reference produces an error or corrective signal which may be utilized to adjust the relationship between the wheel and the reference probe.

Figure 12:
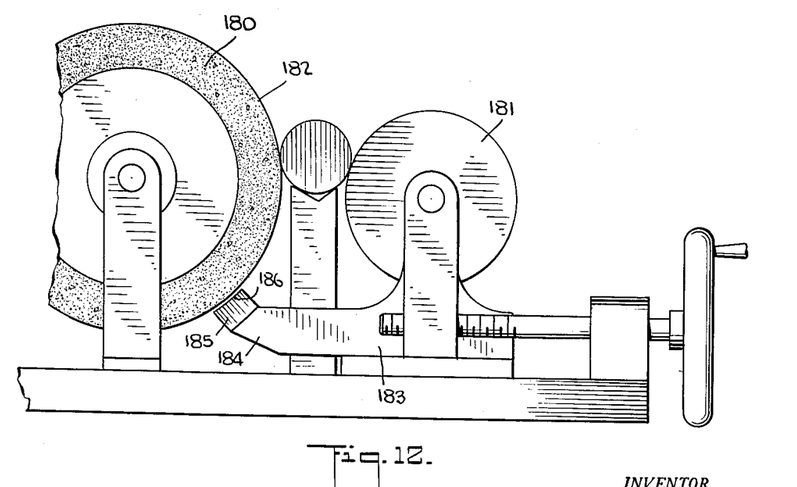
FIG. 12 illustrates the adjustment of the regulating wheel in a centerless grinder.

In FIG. 12 the invention is applied to maintaining the proper relationship between the grinding wheel 180 and the regulating wheel 181 of a centerless grinder. The grinding wheel rotates about a fixed axis and has a generally cylindrical outer peripheral surface 182 which performs the abrasive action. The workpiece is supported on the block and held against the grinding wheel by the regulating wheel. The spacing of the regulating wheel and grinding wheel determines the size of the diameter of the product. The grinding wheel is fixed. The regulating wheel is mounted on a sliding table 183 which moves to and from the grinding wheel. The table has an arm 184 rigid with the table and extending adjacent to the end of the surface of the grinding wheel. A probe 185 is mounted on the arm and positioned in close proximity to the wheel to measure the distance of the probe from the grinding wheel and thus the relation between the regulating wheel and the grinding wheel is precisely determined. The measuring circuit and apparatus of FIG. 7 may be used to measure the distance. The probe 185 has a cylindrical surface 186 facing the cylindrical surface of the grinding wheel and spaced uniformly therefrom. The high frequency signal measures the spacing between the probe and the grinding wheel. This spacing is related to the size of the product and to variations in the relationship between the regulating wheel and the grinding wheel.

I claim:

1. Apparatus for shaping the surface of a workpiece comprising a grinding wheel having abrasive surface means, means for rotatably supporting said grinding wheel in a fixed position, supporting means lineally movable in relation to the grinding wheel, workpiece holding means pivotally mounted on said supporting means to move the workpiece to and from said abrasive surface means, indexing means for feeding said workpiece against said abrasive surface means with said supporting means in a precise relation with said abrasive surface means, position determining electrical means having a capacitive member rigidly mounted on said supporting means adjacent to said abrasive surface means for determining the position of said support means relative to said abrasive surface means and control means connected to said electrical means to receive a signal therefrom for positioning said supporting means in precise relation with said abrasive surface means for accurately forming the surface on the workpiece.

2. Apparatus for forming cutting threads in a tap comprising a grinding wheel having a V-shaped abrasive edge surface, means for rotatably supporting said grinding wheel in a fixed position, a table lineally movable in relation to the grinding wheel, tap supporting means having arms pivotally mounted on said table and on opposite sides of said wheel and rigidly connected to move in unison, said tap means having means for supporting taps at right angles to said wheel, cam means for moving said tap to and from the V-shaped edge of the grinding wheel, position determining electrical means having a V-shaped capacitive member rigidly mounted on said table and positioned adjacent to and on both sides of said abrasive edge surface for determining the position of said table relative to said wheel, and control means connected to said electrical means to receive a signal therefrom for positioning said table in precise relation with said grinding wheel for accurately cutting threads in said tap.

3. A process for forming threads in a workpiece comprising rotating a grinding wheel having a V-shaped abrasive edge at a high speed about a fixed center, electrically and capacitively measuring the relationship between said wheel and said workpiece and positioning the workpiece in a given relation to said grinding wheel, moving said workpiece in the given relation towards the grinding wheel to press the workpiece against the abrasive surface and form a thread therein, electrically and capacitively measuring the abrasive edge during the formation of the thread and interrupting the formation of the thread when the edge loses its shape and moving the workpiece out of the given relation to said grinding wheel, dressing the grinding wheel, capacitively measuring the position of the abrasive edge to create an actuating signal moving the workpiece into the given relation to the grinding wheel and moving the workpiece against the resharpened abrasive surface edge in response to the actuating signal to complete the formation of the thread in the given relation.

4. Apparatus for shaping the surface of a workpiece comprising a grinding wheel having abrasive surface means, means for rotatably supporting said grinding wheel, holding means for rotatably supporting a work piece, means for pivotally supporting said holding means to move a workpiece towards the grinding wheel, base means for supporting said supporting means and said holding means to move one relative to the other to separate said grinding wheel and a workpiece for dressing said grinding wheel and returning said grinding wheel and workpiece to a precise relation, indexing means for feeding a workpiece against said abrasive surfaces, position determining electrical means having a capacitive member mounted on said holding means adjacent to and in capacitive relation to said abrasive means for determining the position of said holding means relative to said abrasive surface means and creating an actuating signal and control means connected to said electrical means to receive the actuating signal for precisely positioning said holding means in relation to said abrasive surface means for accurately forming the surface on a workpiece.

References Cited in the file of this patent

UNITED STATES PATENTS

| 1,549,600 | Mueller | Aug. 11, 1925 |
| 2,010,361 | Harrison | Aug. 6, 1935 |
| 2,108,310 | Griffing | Feb. 15, 1938 |
| 2,116,232 | Blood | May 3, 1938 |
| 2,423,422 | Turrettini | July 1, 1947 |
| 2,843,974 | Butterworth et al. | July 22, 1958 |

FOREIGN PATENTS

| 89,285 | Switzerland | Sept. 16, 1921 |